United States Patent [19]

Mochizuki et al.

[11] Patent Number: 5,348,685
[45] Date of Patent: Sep. 20, 1994

[54] FERROELECTRIC LIQUID CRYSTAL COMPOSITION

[75] Inventors: Akihiro Mochizuki; Shigeo Kasahara; Tetsuya Makino; Masashi Watanabe, all of Kawasaki; Masakatsu Nakatsuka, Tokyo; Kunikiyo Yoshio, Kyoto; Masahiro Satoh, Kyoto; Tetsuya Watanabe, Kyoto; Naoko Sugita, Kyoto; Tatsuroh Yanagi, Kyoto, all of Japan

[73] Assignees: Fujitsu Limited, Kawasaki; Mitsui Toatsu Chemicals, Inc., Tokyo; Sanyo Chemical Industries, Ltd., Kyoto, all of Japan

[21] Appl. No.: 107,191

[22] Filed: Aug. 17, 1993

[30] Foreign Application Priority Data

Oct. 9, 1992 [JP] Japan ................... 4-271990

[51] Int. Cl.$^5$ .............. C09K 19/32; C09K 19/06; C09K 19/34; C09K 19/52
[52] U.S. Cl. ................. 252/299.62; 252/299.61; 252/299.6; 252/299.01
[58] Field of Search ............. 252/299.62, 299.61, 252/299.01, 299.6, 299.67

[56] References Cited

U.S. PATENT DOCUMENTS

| | | | |
|---|---|---|---|
| 4,680,137 | 7/1987 | Isoyama et al. | 252/299.62 |
| 4,705,870 | 11/1987 | Takatsu et al. | 549/369 |
| 4,726,910 | 2/1988 | Takatsu et al. | 252/299.5 |
| 4,754,051 | 6/1988 | Sasaki et al. | 560/8 |
| 4,814,516 | 3/1989 | Takeuchi et al. | 568/631 |
| 4,943,651 | 7/1990 | Nishiyama et al. | 560/56 |
| 5,053,164 | 10/1991 | Nishiyama et al. | 252/299.62 |
| 5,061,399 | 10/1991 | Jenner et al. | 252/299.62 |
| 5,068,053 | 11/1991 | Reiffenrath et al. | 252/299.61 |
| 5,072,021 | 12/1991 | Nakatsuka et al. | 560/56 |
| 5,141,668 | 8/1992 | Nishiyama et al. | 252/299.62 |
| 5,169,556 | 12/1992 | Mochizuki et al. | 252/299.62 |

FOREIGN PATENT DOCUMENTS

| | | |
|---|---|---|
| 0405868A2 | 1/1991 | European Pat. Off. . |
| 0409634A2 | 1/1991 | European Pat. Off. . |
| 0478387A2 | 4/1992 | European Pat. Off. . |
| 1-101389 | 4/1989 | Japan . |

OTHER PUBLICATIONS

"Improved Electroptical Properties of the Naphthalene Base FLC by Tolane FLCs", Proceedings of the 12th International Display Research Conf. 1992, pp. 575–578.

A. Boutcha, et al, "New TGBa Series Exhibiting a Sc* Sa Sa* N* Phase Sequence", Liquid Crystals, 1992, vol. 12, No. 4, 575–591.

A. Mochizuki, et al, "Electro Optical Switching of Bookshelf Layer Structure Ferroelectric Liquid-Crystal", Fujitsu Sci. Tech. J., vol. 27, No. 3, Sep. 1991, pp. 233–242.

Y. Takanishi, et al, "Spontaneous Formation of Quasi-Bookshelf Layer Structure in New Ferroelectric Liquid Crystals Derived From a Naphthalene Ring", Japanese Journal of Applied Physics, Part 2, vol. 29, No. 6, (Jun. 1990), pp. L984–986.

Primary Examiner—Robert L. Stoll
Assistant Examiner—C. Harris
Attorney, Agent, or Firm—Armstrong, Westerman, Hattori, McLeland & Naughton

[57] ABSTRACT

This invention is directed to reduce the viscosity of a naphthalene type mixed liquid crystal and to improve display quality while maintaining a bookshelf layer structure. The ferroelectric liquid crystal composition of the present invention comprises 70 to 97 parts by weight of a naphthalene base mixed liquid crystal and 3 to 30 parts by weight of a predetermined tolan type liquid crystal.

6 Claims, 8 Drawing Sheets

FERROELECTRIC LIQUID CRYSTAL COMPOSITION

BACKGROUND OF THE INVENTION

1. Field of the Invention

This invention relates to a liquid crystal composition. More specifically, the present invention relates to a ferroelectric liquid crystal composition which has reduced viscosity as a liquid crystal composition while maintaining a bookshelf layer structure.

2. Description of the Related Art

Data processing apparatuses such as word processors, personal computers, workstations, and so forth, have become wide spread. The progress of office automation, the down-sizing of apparatuses, and the importance of display devices as an interface with these data processing apparatuses continue to increase. With such a background, liquid crystal displays (LCDs) have become indispensable because they use little power and are compact, flat-panel displays.

The LCD which has been most widely used for computers, etc, is a super-twisted nematic (STN) type liquid crystal. The STN LCD can be driven at a relatively low voltage (about 20 V) and can effect a medium information content display of 640×480 pixels with a contrast ratio of about 10:1. Accordingly, the STN LCD can satisfy the basic display functions of a personal computer or a word processor. As described above, however, even data processors such as workstations have been converted to personal-use systems with the progress of down-sizing as described above. Under such circumstances, higher information contents and area, higher response speed, higher contrast ratio, wider viewing angle, and so forth, have become prerequisites for display devices. Since the STN directly drives the liquid crystal by a simple matrix panel construction, it is not very difficult to accomplish a large area display having a diagonal of 15 inches or more, but it is extremely difficult to increase its information content to 1,240×1,028 pixels (to about 1,000,000 pixels, though the number of pixels depends on the model) as required by workstations, etc. Even if the number of pixels can be increased, the contrast ratio and the response speed of the STN drop remarkably, and the display quality of the STN falls.

With the background described above, the following two methods have been developed and proposed to LCDs produce which can cope with the requirements of workstations. One method is the active matrix LCD in which non-linear active devices, such as thin film transistors, are formed at the points of intersection (pixels) of the matrix. Another is the ferroelectric LCD which employs direct driving by a simple matrix in the same way as the STN LCD.

The active matrix system can apply a voltage for driving the liquid crystal while securing a sufficient voltage margin for each pixel. Therefore, a high contrast ratio and a best response can be expected. However, it is extremely difficult to fabricate a high information content wide-area active matrix panel of the order of 1,240×1,028 pixels and with a diagonal of more than 15 inches for the following two reasons. In the case of a present large-scale panels (at least 6 inches), thin film transistors must be fabricated by the use of amorphous silicon (a-silicon) for the technical reasons (semiconductor fabrication technology for a large area). However, the mobility of electrons of a-silicon necessary for exciting the transistor is low and there is a limit to the increase of the area and the information contents. It is believed that a panel size of about 15 inches is the technical limit at present from the aspect of electron mobility. The other reason is the problem of producibility. In the 1,240×1,028 pixel class, the production yield of the display panel, for which zero defects are required, drops remarkably and hence, the production cost becomes so high that it cannot be comparable to the production of a cathode-ray tube (CRT) display.

On the other hand, since the ferroelectric liquid crystal display employs the simple matrix panel structure and can be of high information content, it can theoretically be applied to a display of the workstation class. To accomplish a practical ferroelectric liquid crystal display (FLCD), however, several problems are yet to be solved. A particularly critical problem is how to attain a large area and uniform orientation of liquid crystal moleculars and how to make the liquid crystal layer structure uniform. The conventional ferroelectric liquid crystal has defects such as zigzag orientation, and has a particularly large orientation variability in a large area display, so that the contrast ratio depends on pixel position. It has been clarified that the zigzag orientation defect (or zigzag defect) results from the layer structure of the liquid crystal (Hiji et al, Japanese Journal of Applied Physics, Vol. 27, No. 1, 1988, pp. L1–L4). In other words, the conventional ferroelectric liquid crystal material has the layer structure having a Chevron structure which is bent in a <-shape near the center of the panel as shown in FIG. 2 of the accompanying drawings and causes the orientation defects such as the zigzag defect. In a bookshelf layer structure wherein the layer structure is arranged perpendicularly to the substrate as shown in FIG. 1, on the other hand, the liquid crystal molecules are uniformly oriented. To practically accomplish uniform orientation and to obtain a high contrast ratio using a ferroelectric liquid crystal which can effect, in principle, large capacity displays and which can be applied to a display of the workstation class, it is very important to obtain the bookshelf structure for the liquid crystal layer structure and to eliminate the zigzag defect. To accomplish the bookshelf layer structure, on the other hand, the liquid crystal material itself must be improved, and this bookshelf layer structure can be obtained by the use of a specific liquid crystal material. The inventors of the present invention have clarified that this bookshelf layer structure can be obtained by using naphthalene type liquid crystals (Mochizuki et al, Ferroelectrics, Vol. 122, 1991, pp. 37–51). However, the conventional naphthalene type liquid crystals generally involve the problems that their viscosity is high and their electro-optical response characteristics particularly in the low temperature range drops. For these reasons, the viscosity of the naphthalene type liquid crystals as the liquid crystal composition must be lowered while maintaining the bookshelf layer structure.

SUMMARY OF THE INVENTION

The present invention is directed to solve the problems with the prior art described above. The ferroelectric liquid crystal composition according to the first embodiment of the present invention comprises:

70 to 97 parts by weight of a naphthalene base mixed liquid crystal (hereinafter referred to also as the "naphthalene type mixed liquid crystal") containing at least three kinds selected from the following five kinds of liquid crystals expressed by the following general formulas I to V:

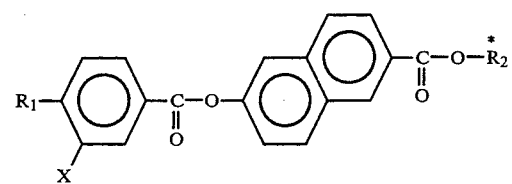
(I)

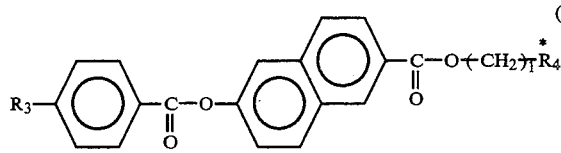
(II)

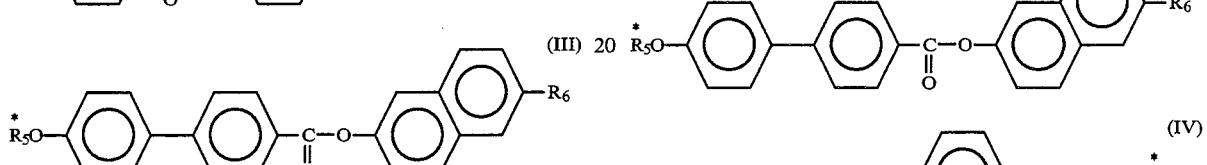
(III)

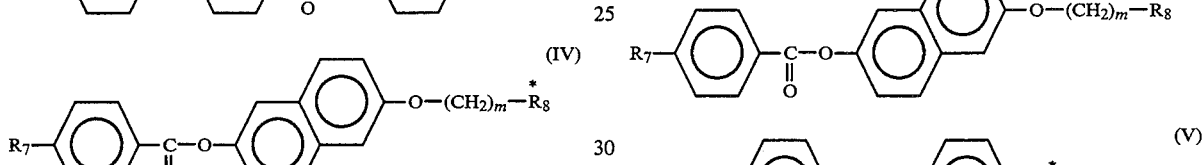
(IV)

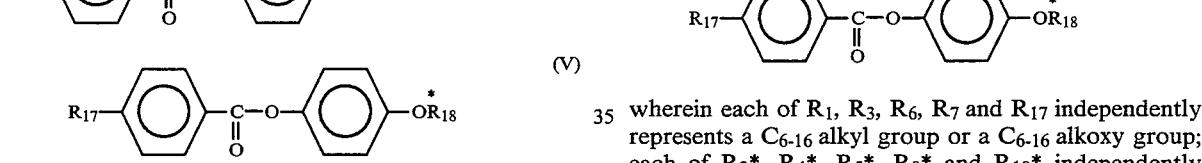
(V)

wherein each of $R_1$, $R_3$, $R_6$, $R_7$ and $R_{17}$ independently represents a $C_{6-16}$ alkyl group or a $C_{6-16}$ alkoxy group; each of $R_2^*$, $R_4^*$, $R_5^*$, $R_8^*$ and $R_{18}^*$ independently represents a $C_{4-16}$ alkyl group having asymmetric carbon at the connecting bond thereof; X represents a hydrogen atom or a fluorine atom; and l and m represent an integer of 1 to 5, respectively; and 3 to 30 parts by weight of a tolan type liquid crystal expressed by the following general formula VI:

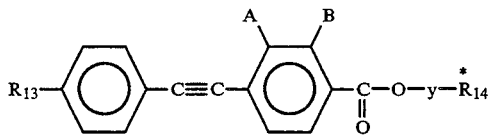
(VI)

wherein $R_{13}$ represents a $C_{6-16}$ alkyl group or a $C_{6-16}$ alkoxy group; $R_{14}^*$ represents a $C_{4-16}$ alkyl group having asymmetric carbon; each of A and B independently represents a hydrogen atom or a fluorine atom; and y represents —$(CH_2)_i$—, with the proviso that i represents an integer of 0 to 5.

The ferroelectric liquid crystal composition according to the second embodiment of the present invention comprises 70 to 97 parts by weight of a naphthalene base mixed liquid crystal containing at least three kinds of liquid crystals selected from the following five kinds of liquid crystals expressed by the following general formulas I to V:

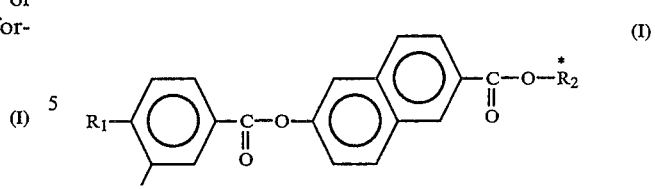
(I)

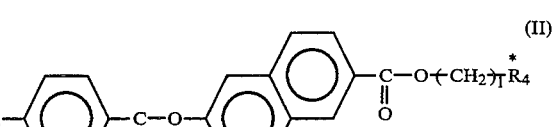
(II)

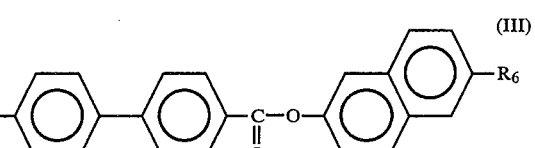
(III)

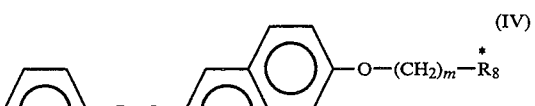
(IV)

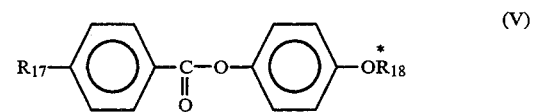
(V)

wherein each of $R_1$, $R_3$, $R_6$, $R_7$ and $R_{17}$ independently represents a $C_{6-16}$ alkyl group or a $C_{6-16}$ alkoxy group; each of $R_2^*$, $R_4^*$, $R_5^*$, $R_8^*$ and $R_{18}^*$ independently represents a $C_{4-16}$ alkyl group having asymmetric carbon at the connecting bond thereof; X represents a hydrogen atom or a fluorine atom; and l and m represents an integer of 1 to 5, respectively; and 3 to 30 parts by weight of a tolan type liquid crystal expressed by the following general formula VII:

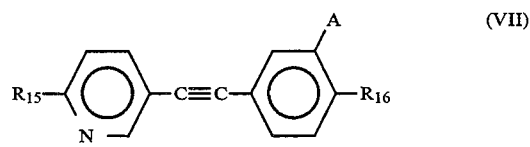
(VII)

wherein $R_{15}$ represents a $C_{6-16}$ alkyl group or a $C_{6-16}$ alkoxy group; $R_{16}$ represents a $C_{6-16}$ alkyl group or a $C_{6-16}$ alkoxy group; and A represents a hydrogen atom or a fluorine atom.

The ferroelectric liquid crystal composition according to the third embodiment of the present invention comprises 70 to 97 parts by weight of a naphthalene base mixed liquid crystal containing at least three kinds of liquid crystals selected from the following five kinds of liquid crystals expressed by the general formulas VIII to XI and V:

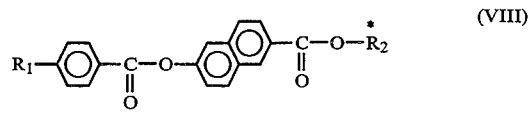
(VIII)

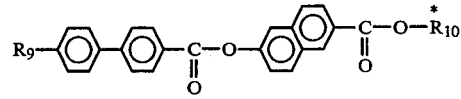
(IX)

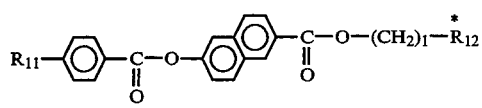
(X)

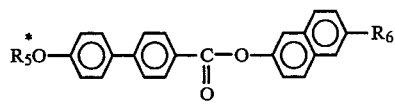
(XI)

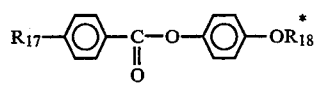
(V)

wherein each of $R_1$, $R_6$, $R_9$, $R_{11}$ and $R_{17}$ independently represents a $C_{6-16}$ alkyl group or a $C_{6-16}$ alkoxy group; each of $R_2^*$, $R_5^*$, $R_{10}^*$, $R_{12}^*$ and $R_{18}^*$ independently represents mutually a $C_{4-16}$ alkyl group having asymmetric carbon at the connecting bond thereof; and l represents an integer of 1 to 5; and 3 to 30 parts by weight of a tolan type liquid crystal expressed by the general formula VI:

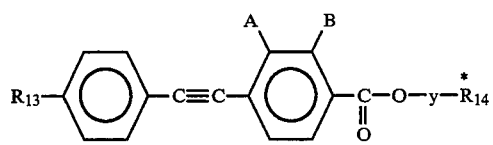
(VI)

wherein $R_{13}$ represents a $C_{6-16}$ alkyl group or a $C_{6-16}$ alkoxy group; $R_{14}^*$ represents a $C_{4-16}$ alkyl group having asymmetric carbon; A and B each independently represents a hydrogen atom or a fluorine atom; and y represents —$(CH_2)_i$—, with the proviso that i represents an integer of 0 to 5.

Further, the ferroelectric liquid crystal composition according to the fourth embodiment of the present invention comprises 70 to 97 parts by weight of a mixed naphthalene base liquid crystal containing at least three kinds of liquid crystals selected from the following five kinds of liquid crystals expressed by the general formulas VIII to XI and V:

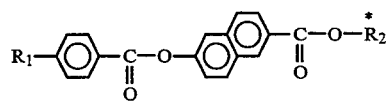
(VIII)

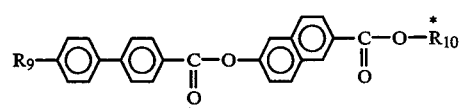
(IX)

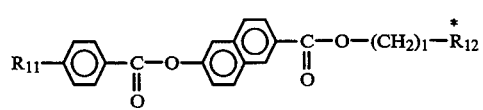
(X)

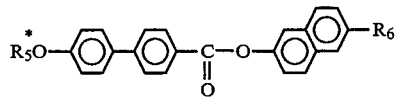
(XI)

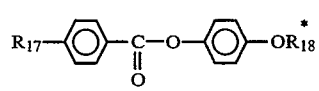
(V)

wherein each of $R_1$, $R_6$, $R_9$, $R_{11}$ and $R_{17}$ independently represents a $C_{6-16}$ alkyl group or a $C_{6-16}$ alkoxy group; each of $R_2^*$, $R_5^*$, $R_{10}^*$, $R_{12}^*$ and $R_{18}^*$ independently represents a $C_{4-16}$ alkyl group having asymmetric carbon; and l represents an integer of 1 to 5; and 3 to 30 parts by weight of a tolan type liquid crystal expressed by the following general formula VII:

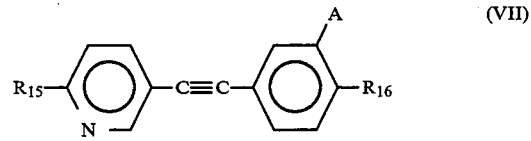
(VII)

wherein each of $R_{15}$ and $R_{16}$ independently represents a $C_{6-16}$ alkyl group or a $C_{6-16}$ alkoxy group; and A represents a hydrogen atom or a fluorine atom.

Further, the ferroelectric liquid crystal composition according to the fifth embodiment of the present invention comprises 70 to 97 parts by weight of a naphthalene base mixed liquid crystal containing at least three kinds of liquid crystals selected from the following five kinds of liquid crystals expressed by the following general formulas I to V:

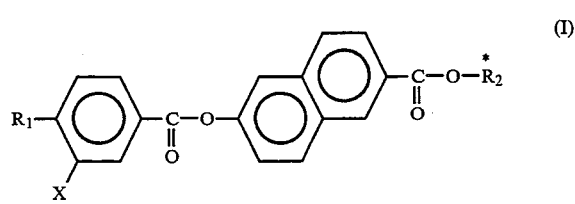
(I)

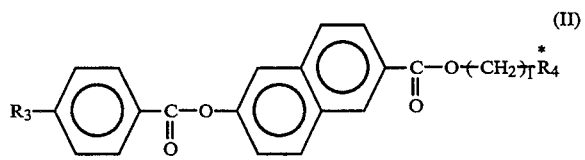
(II)

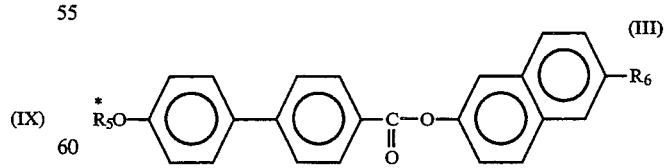
(III)

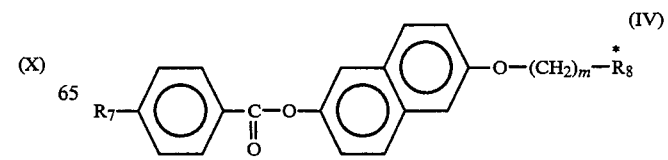
(IV)

-continued

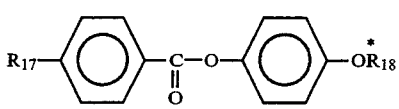

wherein each of $R_1$, $R_3$, $R_6$, $R_7$ and $R_{17}$ independently represents a $C_{6-16}$ alkyl group or a $C_{6-16}$ alkoxy group; each of $R_2^*$, $R_4^*$, $R_5^*$, $R_8^*$ and $R_{18}^*$ independently represents a $C_{4-16}$ alkyl group having asymmetric carbon at the connecting bond thereof; X represents a hydrogen atom or a fluorine atom; and l and m represent an integer of 1 to 5, respectively; and 3 to 30 parts by weight of a tolan type liquid crystal expressed by the following general formulas VI and VII:

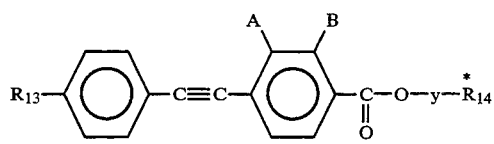

(VI)

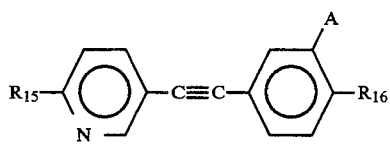

(VII)

wherein each of $R_{13}$, $R_{15}$ and $R_{16}$ independently represents a $C_{6-16}$ alkyl group or a $C_{6-16}$ alkoxy group; $R_{14}^*$ represents a $C_{4-16}$ alkyl group having asymmetric carbon; A and B each independently represents a hydrogen atom or a fluorine atom; and y represents —$(CH_2)_i$—, with the proviso that i is an integer of 0 to 5.

The ferroelectric liquid crystal composition according to the sixth embodiment of the present invention comprises 70 to 97 parts by weight of a naphthalene base mixed liquid crystal containing at least three kinds of liquid crystals selected from the following five kinds of liquid crystals expressed by the following general formulas VIII to XI and V:

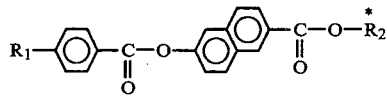

(VIII)

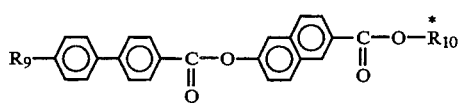

(IX)

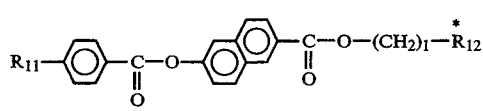

(X)

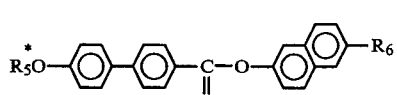

(XI)

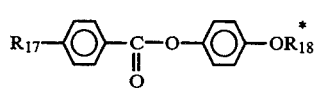

(V)

wherein each of $R_1$, $R_6$, $R_9$, $R_{11}$ and $R_{17}$ independently represents a $C_{6-16}$ alkyl group or a $C_{6-16}$ alkoxy group; each of $R_2^*$, $R_5^*$, $R_{10}^*$, $R_{12}^*$ and $R_{16}^*$ independently represents mutually a $C_{4-16}$ alkyl group having asymmetric carbon; and l represents an integer of 1 to 5; and 3 to 30 parts by weight of a tolan type mixed liquid crystal expressed by the following general formulas VI and VII:

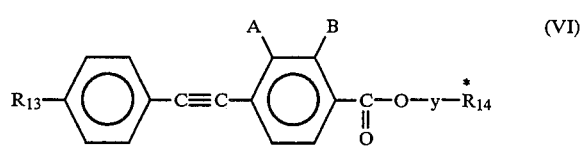

(VI)

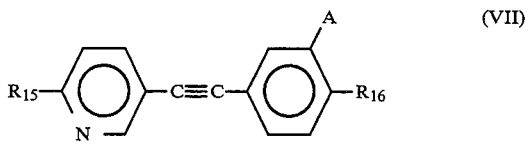

(VII)

wherein each of $R_{13}$, $R_{15}$ and $R_{16}$ independently represents a $C_{6-16}$ alkyl group or a $C_{6-16}$ alkoxy group; $R_{14}^*$ represents a $C_{4-16}$ alkyl group having asymmetric carbon; A and B each independently represents a hydrogen atom or a fluorine atom; and y represents —$(CH_2)_i$—, with the proviso that i is an integer of 0 to 5.

In the above formulae I through XI, each of $R_1$, $R_3$, $R_6$, $R_7$, $R_9$, $R_{11}$, $R_{13}$, $R_{15}$, $R_{16}$, and $R_{17}$ is preferably a chain $C_{6-16}$ alkyl or alkoxy group, especially a linear $C_{6-16}$ alkyl or alkoxy group. Examples of the group may be mentioned n-hexyl, 2-ethylbutyl, 3,3-dimethylbutyl, n-heptyl, n-octyl, 2-ethylhexyl, tert-octyl, n-nonyl, n-decyl, n-undecyl, n-dodecyl, n-tridecyl, n-tetradecyl, n-pentadecyl, n-hexadecyl, n-hexyloxy, n-heptyloxy, n-octyloxy, 2-ethylhexyloxy, n-nonyloxy, n-decyloxy, n-undecyloxy, n-dodecyloxy, n-tridecyloxy, n-tetradecyloxy, n-pentadecyloxy and n-hexadecyloxy groups.

Examples of the $C_{4-16}$ alkyl group having asymmetric carbon at the connecting bond thereof as $R_2^*$, $R_4^*$, $R_8^*$, $R_{10}^*$, $R_{12}^*$ or $R_{18}^*$ in the above formulae I through V and VIII through XI may include 1-methylpropyl, 1-methylbutyl, 1-methylpentyl, 1-methylhexyl, 1-methylheptyl, 1-methyloctyl, 1-methylnonyl, 1-methyldecyl, 1-methylundecyl, 1-methyldodecyl, 1-methyltetradecyl, 1-methylpentadecyl, 1-ethylbutyl, 1-ethylhexyl, 1-ethyloctyl, 1-butylhexyl and 1-hexyldecyl groups having asymmetric carbon.

Examples of the $C_{4-16}$ alkyl group having asymmetric carbon as $R_{14}^*$ in the above formula VI may include 1-methylpropyl, 1-methylbutyl, 1-methylpentyl, 1-methylhexyl, 1-methylheptyl, 1-methyloctyl, 1-methylnonyl, 1-methyldecyl, 1-methylundecyl, 1-methyldodecyl, 1-methyltetradecyl, 1-methylpentadecyl, 1-ethylbutyl, 1-ethylhexyl, 1-ethyloctyl, 1-butylhexyl, 1-hexyldecyl, 2-methylbutyl, 3-methylbutyl, 4-methylhexyl, 5-methylheptyl, 6-methyloctyl and 3,7-dimethyloctyl groups having asymmetric carbon.

The process according to which the present invention is completed, and the principle of the present invention, will be hereinafter explained.

The molecular orientation of the ferroelectric liquid crystal is, in one aspect, fundamentally different from that of the STN liquid crystal of the prior art. The STN liquid crystal is a normal dielectric, and each molecule does not have a distinct "head" or "tail". Therefore, only the directions of the molecules, that is, the molecular orientation, is of interest. On the other hand, the ferroelectric liquid crystal always has a spontaneous polarization irrespective of the existence of an impressed field. Accordingly, the coulomb interaction is extremely strong between the molecules. For this reason, the orientation state of the ferroelectric liquid crystal molecules is greatly affected by the polarization state of the liquid crystal molecules. This molecular state is closely associated with the rotating state of the molecules. In other words, as shown in FIG. 3, when the molecule freely rotates in the direction of the major axis thereof, polarization is cancelled and spontaneous polarization as a bulk does not occur. If this rotation is not free rotation, spontaneous polarization as a vector occurs as shown in FIG. 4. In other words, the more the free rotation round the major axis of the molecule is restricted, the greater and the stabler becomes this spontaneous polarization. The occurrence of spontaneous polarization due to restriction of the rotation round the major axis can be accomplished by introducing an optically active group into the molecular structure. The optically active group forms a mirror image isomer and lowers the symmetry of rotation of the molecule. In ordinary ferroelectric liquid crystals, the rotation round the major axis of the molecule is restricted as a result of a reduction in the symmetry of rotation of the molecule by the optically active group, and spontaneous polarization occurs. In the naphthalene type liquid crystal composition, a chiral smectic liquid crystal having an optically active group restricts the rotation of the entire composition round the major axis of the molecule. However, since this restriction is relatively strong, spontaneous polarization occurs and the viscosity at the time of inversion of polarization is also high. In the naphthalene type liquid crystal, however, the bookshelf layer structure, which has the greatest significance to a ferroelectric liquid crystal display, is accomplished (Mochizuki et al. "Ferroelectrics", Vol. 122, 1991, pp. 37–51), and stable memory performance, a high contrast ratio, a wide viewing angle and high speed response (at above room temperature) can be obtained.

Therefore, the inventors of the present invention have examined a method of lowering the viscosity at the time of inversion of polarization without damaging the book-shelf layer structure of the naphthalene type liquid crystal composition. The mechanism of occurrence of spontaneous polarization in the ferroelectric liquid crystal lies in the restriction of rotation round the major axis of molecule as described above. Generally speaking, therefore, the more this rotation is restricted the greater becomes spontaneous polarization, the more rigid becomes the liquid crystal layer structure and the higher becomes the viscosity. Accordingly, to reduce the viscosity of the naphthalene type liquid crystal composition, the restriction of rotation round the major axis of molecule must be somehow weakened. It is of importance in this instance to weaken the restriction of rotation without damaging the book-shelf structure of the naphthalene type liquid crystal composition. To accomplish this object, the present inventors have examined a wide variety of liquid crystals and have found out that mixing a tolan type liquid crystal having an isotropic phase (I)—smectic A phase ($S_A$)—chiral smectic C phase ($S_C^*$) in the same way as the naphthalene type liquid crystal compositions having an ordinary phase transition series, and having also a wide $S_A$ phase temperature range in the naphthalene type liquid compositions, is effective for accomplishing the object. In this way, the present invention is completed.

When liquid crystals having a low viscosity other than the tolan type liquid crystal, such as a phenylpyrimidine type liquid crystal, are added, there occur problems in that the bookshelf layer is lost and converted to the Chevron layer structure and the $S_C^*$ phase temperature range is reduced. When a phenyl benzoate type liquid crystal is mixed, the low viscosity as the primary object cannot be accomplished, though the bookshelf layer structure can be retained and the $S_C^*$ phase temperature range, too, can be kept wide.

As already described, the ferroelectric liquid crystal composition according to the present invention comprises 70 to 97 parts by weight of a mixed naphthalene base liquid crystal and 3 to 30 parts by weight of the liquid crystal expressed by the general formula VI or VII as the tolan type liquid crystal.

The proportion of addition of the tolan type liquid crystal to the liquid crystal composition of the present invention is limited to 3 to 30 parts by weight for the following reasons.

If the amount of addition of the tolan type liquid crystal exceeds 30 parts by weight, the $S_A$ phase—$S_C^*$ phase transition temperature generally drops to a temperature below room temperature, and a ferroelectric phase cannot be obtained at room temperature.

If the amount of addition is less than 3 parts by weight, the effect of reducing the viscosity does not appear.

By the way, a particularly preferred proportion of addition ranges from 10 to 25 parts by weight.

The present invention also provides a ferroelectric liquid crystal display comprising the ferroelectric liquid crystal compositions of all of the embodiments described above, which are sealed into a cell between insulating substrates equipped with driving electrodes.

In other words, the ferroelectric liquid crystal display according to the present invention is a liquid crystal device having a cell structure 6 in which the ferroelectric liquid crystal composition 5 of the present invention is sandwiched between two insulating substrates 1 equipped with driving electrodes 2 as shown in FIG. 8. By the way, an insulating film 3 and an orientation film 4 may be deposited to the insulating substrate 1, whenever necessary, as shown in FIG. 8.

Hereinafter, some preferred embodiments of the present invention will be explained further definitely with reference to the accompanying drawings. It is to be noted, however, that these embodiments are merely illustrative but do not in any way limit the present invention.

DESCRIPTION OF THE PREFERRED EMBODIMENTS

Figure 1:
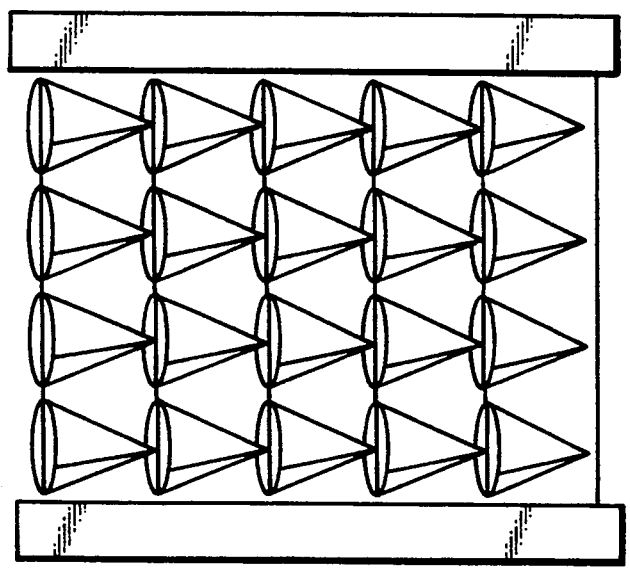
FIG. 1 is a schematic view showing a book-shelf structure.
Figure 2:
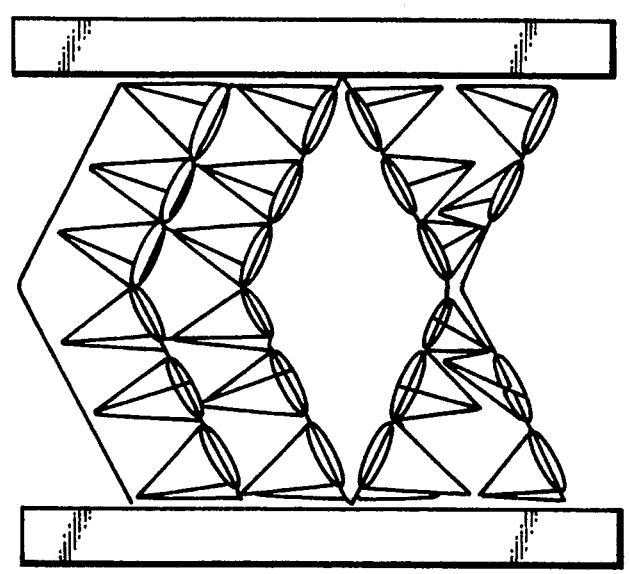
FIG. 2 is a schematic view showing a chevron structure.
Figure 3:
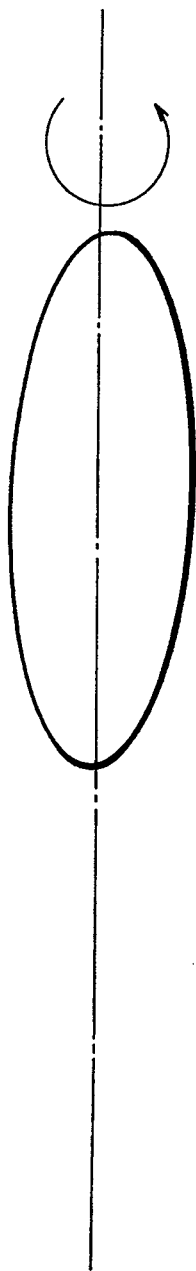
FIG. 3 is a schematic view showing a mechanism in which spontaneous polarization does not occur.
Figure 4:
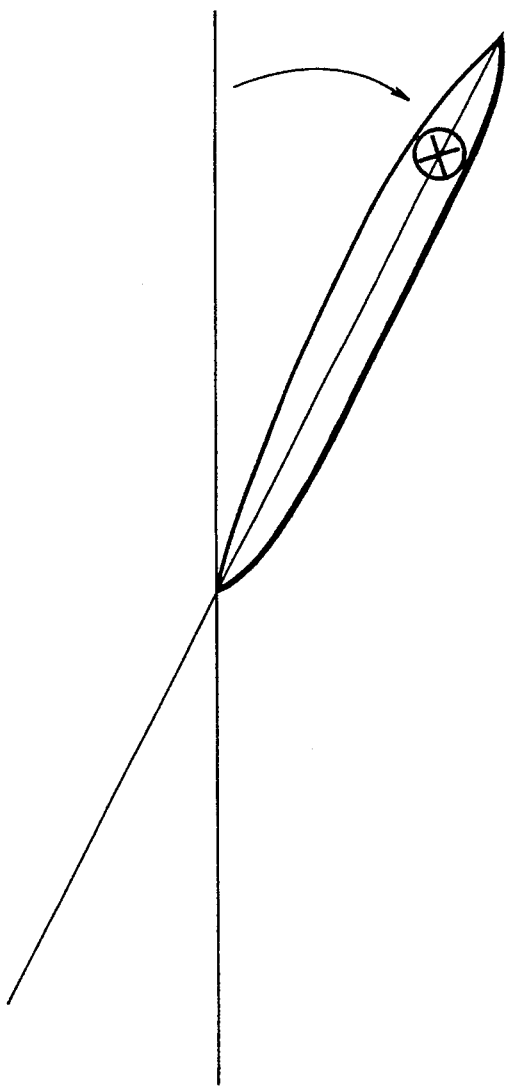
FIG. 4 is a schematic view showing a mechanism in which spontaneous polarization occurs.

Mixed liquid crystals each comprising two kinds of compositions I and II tabulated in the following Table 1 were used as the naphthalene base mixed liquid crystal.

TABLE 1

Composition of naphthalene base mixed liquid crystal

| | parts by weight |
|---|---|
| Composition I | |
| $C_9H_{19}O$—⟨benzene,F⟩—C(=O)—O—⟨naphthalene⟩—C(=O)—O—CH(CH_3)—C_6H_{13}* | 5.0 |
| $C_{12}H_{25}O$—⟨benzene⟩—C(=O)—O—⟨naphthalene⟩—C(=O)—O—(CH_2)_3—CH(CH_3)*—C_2H_5 | 20.0 |
| $C_6H_{13}$*CH(CH_3)O—⟨benzene⟩—⟨benzene⟩—C(=O)—O—⟨naphthalene⟩—OC_6H_{13} | 5.0 |
| $C_{12}H_{25}O$—⟨benzene⟩—C(=O)—O—⟨naphthalene⟩—O—(CH_2)_5—CH(CH_3)*—C_2H_5 | 30.0 |
| $C_{10}H_{21}O$—⟨benzene⟩—CO—O—⟨benzene⟩—O(CH_2)_3*CH(CH_3)C_2H_5 | 40.0 |
| Composition II | |
| $C_{12}H_{25}O$—⟨benzene⟩—C(=O)—O—⟨naphthalene⟩—C(=O)—O—CH(CH_3)—C_6H_{13}* | 30.0 |
| $C_{10}H_{21}O$—⟨benzene⟩—⟨benzene⟩—C(=O)—O—⟨naphthalene⟩—C(=O)—O—CH(CH_3)—C_6H_{13}* | 5.0 |
| $C_{12}H_{25}O$—⟨benzene⟩—C(=O)—O—⟨naphthalene⟩—C(=O)—O—(CH_2)_3—CH(CH_3)*—C_2H_5 | 20.0 |

TABLE 1-continued

Composition of naphthalene base mixed liquid crystal

| | parts by weight |
|---|---|
| $C_6H_{13}\overset{*}{C}HO$—[ring]—[ring]—$\underset{O}{\overset{\|}{C}}$—O—[ring-naphthalene]—$OC_6H_{13}$ with $CH_3$ on chiral carbon | 5.0 |
| $C_{10}H_{21}O$—[ring]—$\underset{O}{\overset{\|}{C}}$—O—[ring]—$O(CH_2)_3\overset{*}{C}HC_2H_5$ with $CH_3$ | 40.0 |

Ferroelectric liquid crystal compositions (A to T) were prepared by adding the following tolan type liquid crystals to these base mixed liquid crystals, respectively. The viscosity, the liquid crystal phase temperature range and the layer structure were measured for each of the resulting liquid crystal compositions.

The viscosity reducing effect of the naphthalene type mixed liquid crystals by mixing the tolan type liquid crystal was evaluated by the rate of polarization inversion, that is, by the viscosity calculated from a half width value of a polarization switching current peak. The liquid crystal layer structure was confirmed by X-ray diffraction.

Composition A: Example of mixing of optically active tolan type liquid crystal having ester bond naphthalene type mixed liquid crystal I
tolan type liquid crystal 1

$C_{10}H_{21}O$—[ring]—$C\equiv C$—[ring with F]—$\underset{O}{\overset{\|}{C}}$—O—$(CH_2)_5$—$\overset{CH_3}{\underset{*}{C}H}C_2H_5$ 15 parts by weight

| Name of composition | A-1 | A-2 | A-3 | A-4 | A-5 |
|---|---|---|---|---|---|
| naphthalene type mixed liquid crystal I | 95.2 | 90.0 | 85.1 | 80.0 | 75.5 |
| tolan type liquid crystal 1 | 4.8 | 9.1 | 14.9 | 20.0 | 24.5 |

Composition B: Example of mixing of optically active tolan type liquid crystal having ester bond naphthalene type mixed liquid crystal I   85 parts by weight $C_{12}H_{25}O$—[ring]—$C\equiv C$—[ring]—$\underset{O}{\overset{\|}{C}}$—O—$CH_2\overset{*}{C}HC_2H_5$ with $CH_3$ 15 parts by weight Composition C: Example of mixing of optically active tolan type liquid crystal having ester bond naphthalene type mixed crystal I   85 parts by weight $C_{10}H_{21}O$—[ring]—$C\equiv C$—[ring with F]—$\underset{O}{\overset{\|}{C}}$—O—$CH_2\overset{*}{C}HC_2H_5$ with $CH_3$ 15 parts by weight Composition D: Example of mixing optically active tolan type liquid crystal having ester bond naphthalene type mixed crystal I   85 parts by weight

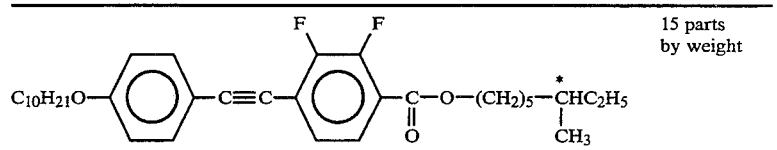    15 parts by weight

Composition E: Example of mixing of two kinds of optically active tolan type liquid crystals having ester bond naphthalene type mixed crystal I    80 parts by weight

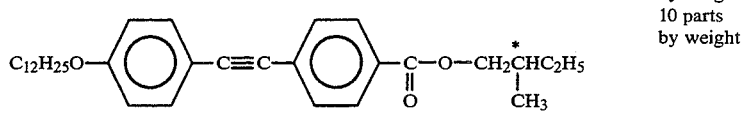    10 parts by weight

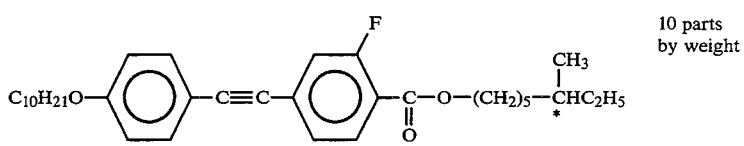    10 parts by weight

Composition F: Example of mixing of optically inactive tolan type liquid crystal having pyridine ring naphthalene type mixed liquid crystal I    85 parts by weight

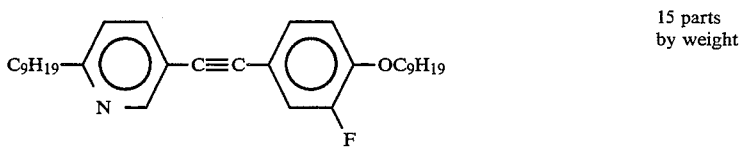    15 parts by weight

Composition G: Example of mixing optically inactive tolan type liquid crystal having pyridine ring naphthalene type mixed liquid crystal I    85 parts by weight

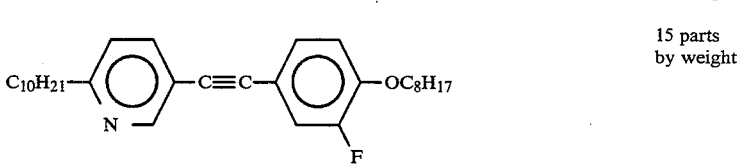    15 parts by weight

Composition H: Example of mixing of optically inactive tolan type liquid crystal having pyridine ring naphthalene type mixed liquid crystal    85 parts by weight

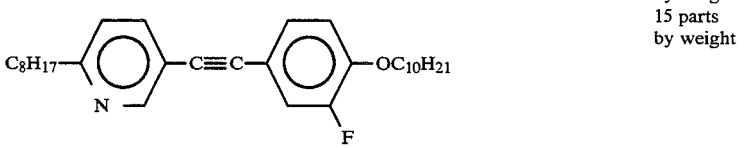    15 parts by weight

Composition I: Example of mixing of optically inactive tolan type liquid crystal having pyridine ring naphthalene type mixed liquid crystal    76 parts by weight

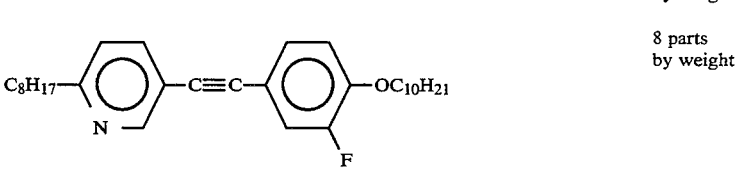    8 parts by weight

-continued

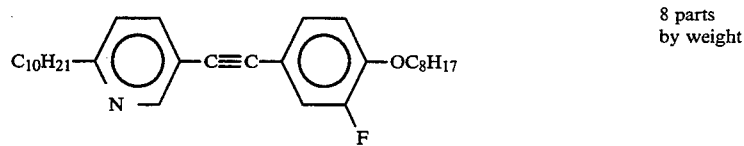

8 parts by weight

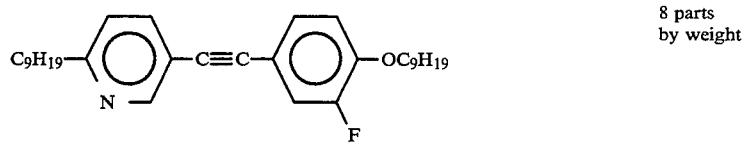

8 parts by weight

Composition J: Example of mixing of optically inactive tolan type liquid crystal having pyridine ring naphthalene type mixed liquid crystal I 76 parts by weight

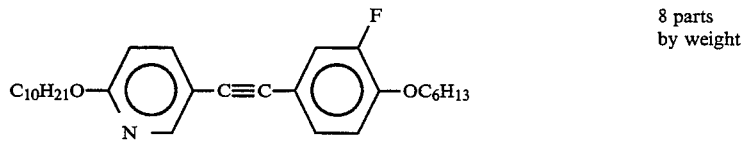

8 parts by weight

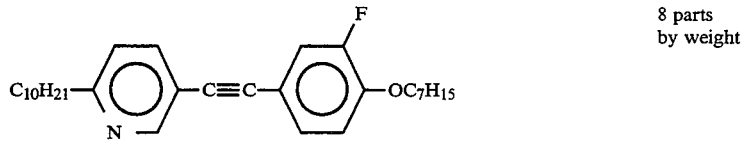

8 parts by weight

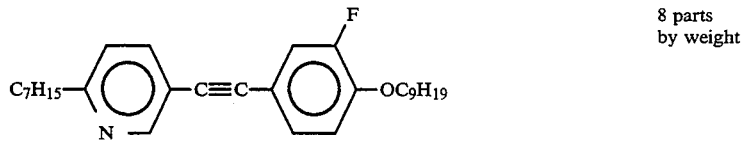

8 parts by weight

Composition K: Example of mixing of optically inactive tolan type liquid crystal having pyridine ring and optically active tolan type liquid crystals having ester bond naphthalene type mixed liquid crystal I 76 parts by weight

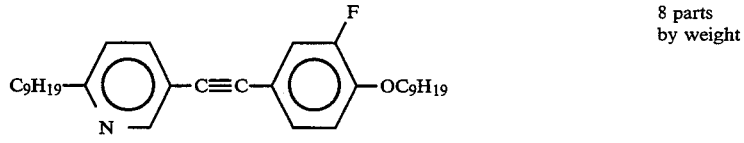

8 parts by weight

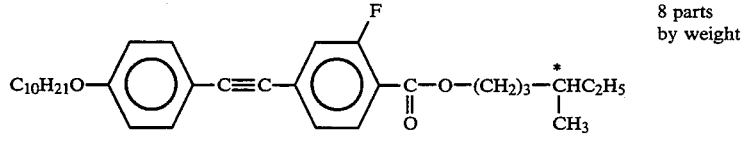

8 parts by weight

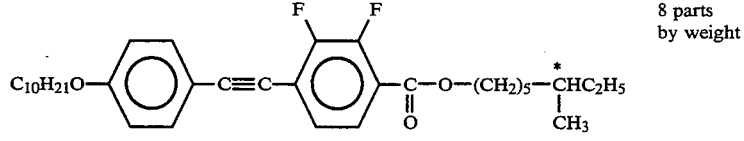

8 parts by weight

Composition L: Example of mixing of optically inactive tolan type liquid crystal having pyridine ring and optically active tolan type liquid crystals having ester bond naphthalene type mixed liquid crystal I 76 parts by weight

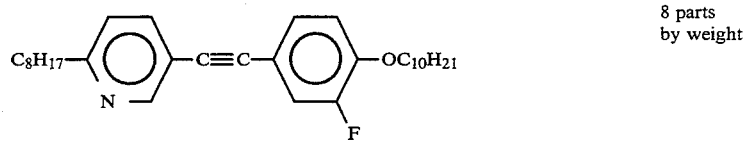

8 parts by weight

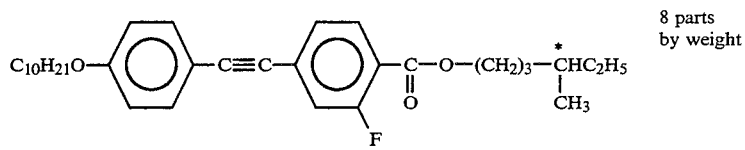

8 parts by weight

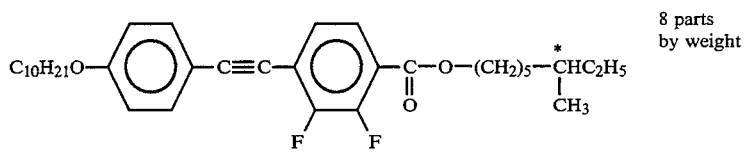

8 parts by weight

Composition M: Example of mixing optically active tolan type liquid crystal having ester bond

| | |
|---|---|
| naphthalene type mixed liquid crystal II | 85 parts by weight |

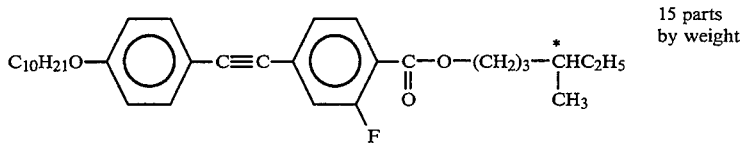

15 parts by weight

Composition N: Example of mixing of optically active tolan type liquid crystal having ester bond

| | |
|---|---|
| naphthalene type mixed liquid crystal II | 85 parts by weight |

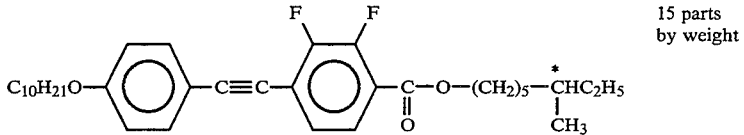

15 parts by weight

Composition O: Example of mixing of optically active tolan type liquid crystal having ester bond

| | |
|---|---|
| naphthalene type mixed liquid crystal I | 85 parts by weight |

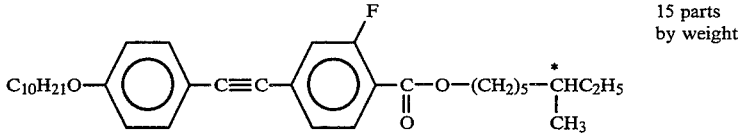

15 parts by weight

Composition P: Example of mixing of two kinds of optically active tolan type liquid crystals having ester bond

| | |
|---|---|
| naphthalene type mixed liquid crystal II | 80 parts by weight |

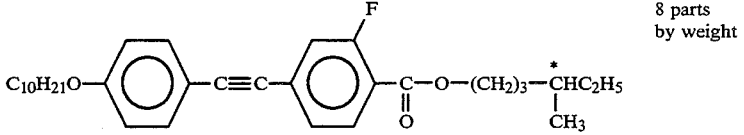

8 parts by weight

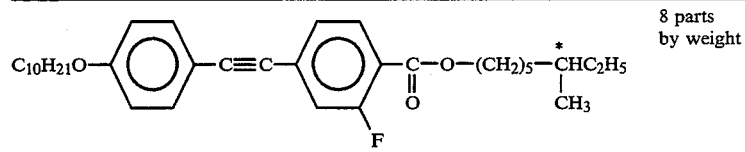

| | 8 parts by weight |

Composition Q: Example of mixing of optically inactive tolan type liquid crystal having pyridine ring and optically active tolan type liquid crystals having ester bond

| naphthalene type mixed liquid crystal II | 76 parts by weight |

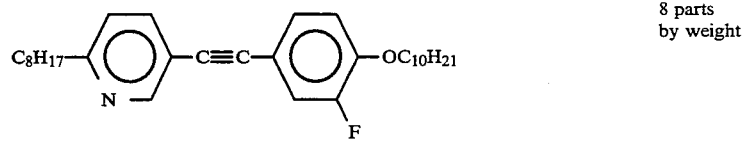

| | 8 parts by weight |

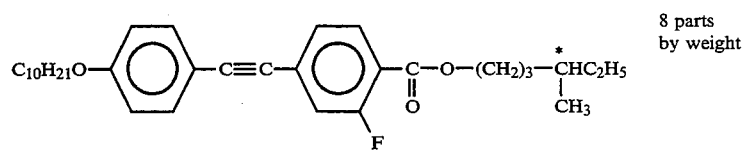

| | 8 parts by weight |

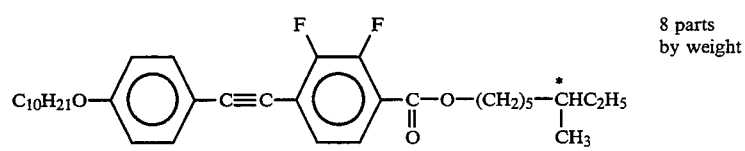

| | 8 parts by weight |

Composition R: Example of mixing of optically inactive tolan type liquid crystal having pyridine ring and optically active tolan type liquid crystals having ester bond

| naphthalene type mixed liquid crystal II | 76 parts by weight |

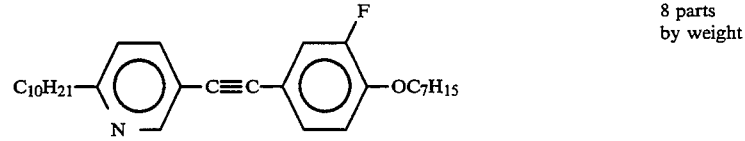

| | 8 parts by weight |

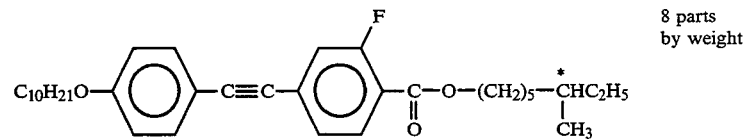

| | 8 parts by weight |

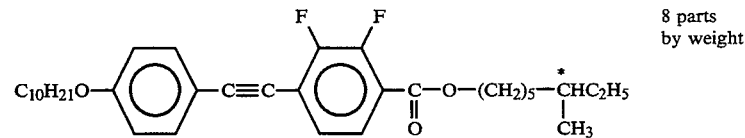

| | 8 parts by weight |

Composition S: Example of mixing optically active tolan type liquid crystal having ester bond

| naphthalene type mixed liquid crystal II | 75 parts by weight |

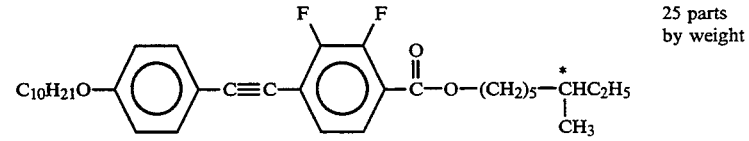

| | 25 parts by weight |

Composition T: Example of mixing of optical active tolan type liquid crystal having ester bond naphthalene type mixed liquid crystal II  72 parts by weight

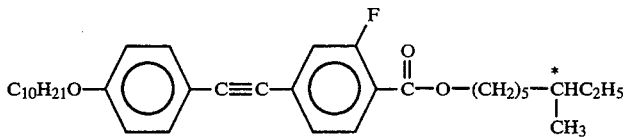

28 parts by weight

For comparison, on the other hand, the following compositions were prepared using liquid crystals other than the tolan type, and their characteristics were measured in the same way as described above. The results were tabulated in Table 2.

Composition U: Example of mixing of optically inactive phenylpyrimidine liquid crystal naphthalene type mixed liquid crystal I  85 parts by weight

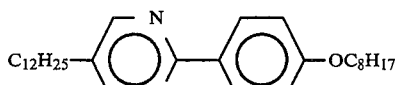

15 parts by weight

Composition V: Example of mixing optically active phenylpyrimidine liquid crystal naphthalene type mixed liquid crystal I  85 parts by weight

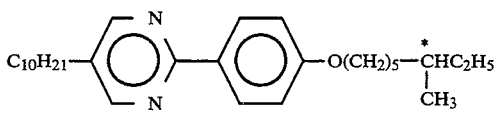

15 parts by weight

Composition W: Example of mixing optically active phenylpyrimidine liquid crystal having ester bond naphthalene type mixed liquid crystal I  85 parts by weight

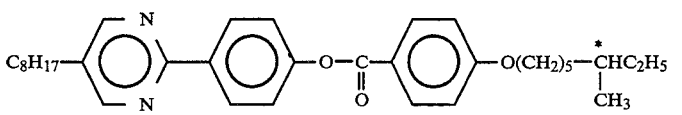

15 parts by weight

Composition X: Example of mixing of optically active ester type liquid crystal naphthalene type mixed liquid crystal I  85 parts by weight

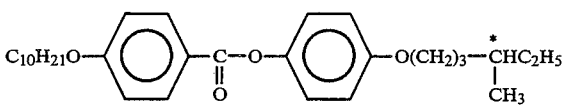

15 parts by weight

Composition Y: Example of mixing of optically inactive phenylpyrimidine liquid crystal naphthalene type mixed liquid crystal II  85 parts by weight

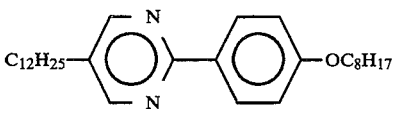

15 parts by weight

For comparison, compositions [1] to [5] containing the components outside the range of the naphthalene type mixed liquid crystal constituting the composition of the present invention and the range of the tolan type liquid crystal composition were prepared, and their characteristics were measured in the same way as described above. The results were tabulated in Table 2.

Example where the tolan type liquid crystal exceeded 30 parts by weight:

| Composition [1] naphthalene type mixed liquid crystal I | 65 parts by weight |
|---|---|
| 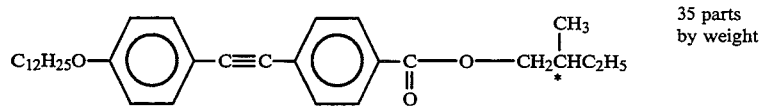 | 35 parts by weight |

The $S_A$—$S_C$* phase transition temperature dropped below 25° C. and a ferroelectric phase was not exhibited at room temperature.

| Composition [2] naphthalene type mixed liquid crystal I | 60 parts by weight |
|---|---|
| 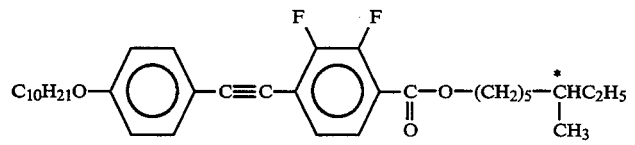 | 40 parts by weight |

The phase became the $S_A$ phase at room temperature and the ferroelectric phase was not exhibited.

| Composition [3] naphthalene type mixed liquid crystal II | 68 parts by weight |
|---|---|
| 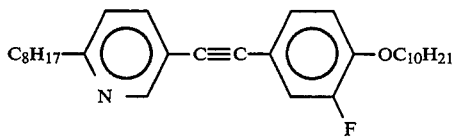 | 16 parts by weight |
| 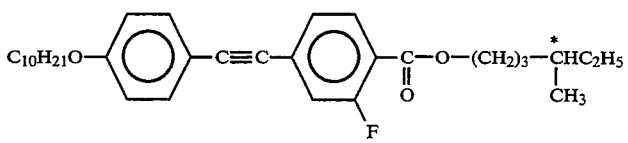 | 16 parts by weight |

The phase became the $S_A$ phase at room temperature and the ferroelectric phase was not exhibited.

| Composition [4] naphthalene type mixed liquid crystal I | 98 parts by weight |
|---|---|
| 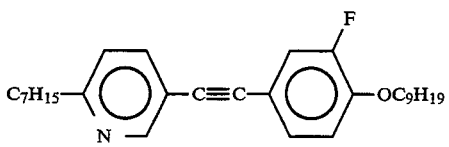 | 2 parts by weight |
| Composition [5] naphthalene type mixed liquid crystal II | 99 parts by weight |
| 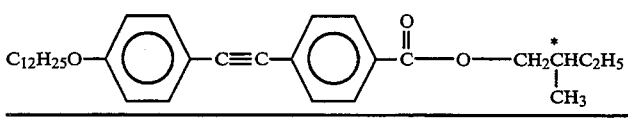 | 1 part by weight |

Figure 5:
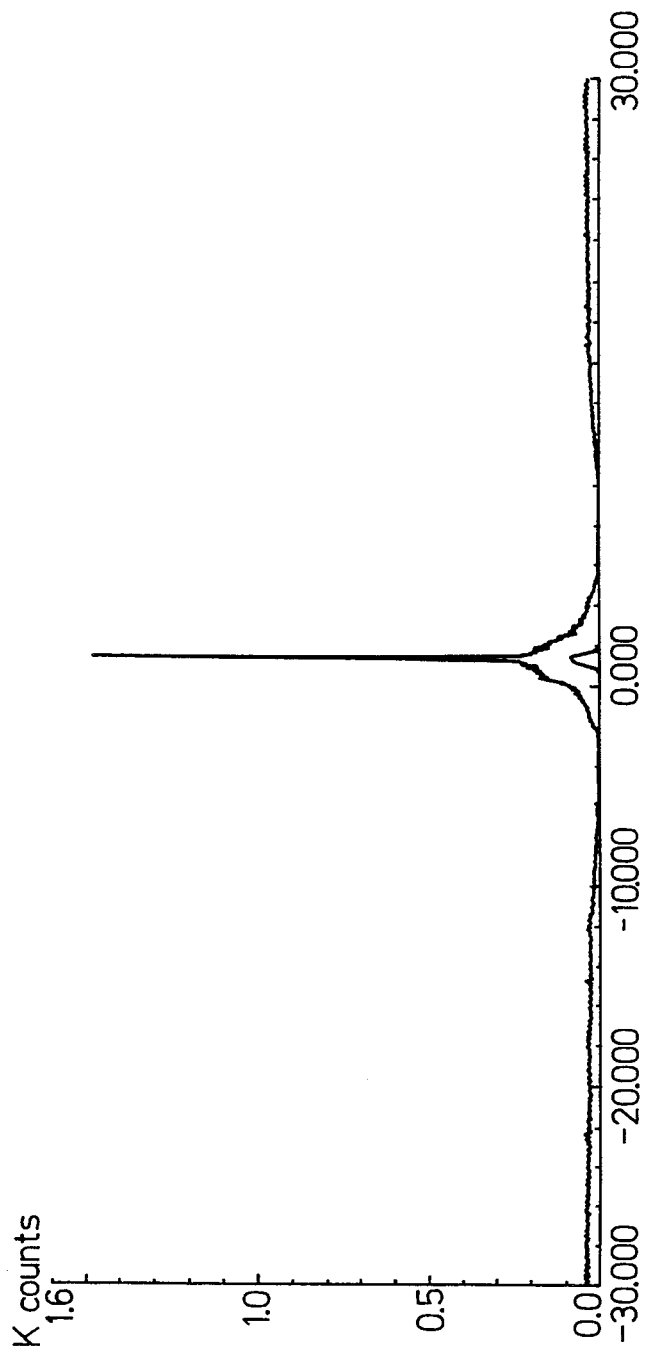
FIG. 5 is an X-ray diffraction profile of a liquid crystal composition according to the present invention.

The viscosity and the $S_A$—$S_C$* phase transition temperature of each of these liquid crystal mixed compositions are tabulated in Table 2. The compositions containing the tolan type liquid crystal mixed therewith maintained the bookshelf structure. As an example, the X-ray diffraction profile of the composition L was shown in FIG. 5. As is obvious from Table 2, the viscosity ($\eta$) and spontaneous polarization ($P_s$) could be drastically reduced without much changing the $S_A$—$S_C^*$ phase transition temperature by mixing the tolan type liquid crystal with the naphthalene type composition as the base. As shown in FIG. 5, the X-ray diffraction profile at this time was a straight line substantially at the position of 0° and represented that the liquid crystal layer structure formed by this liquid crystal composition stood upright to the substrate. This indicates that the liquid crystal composition according to the present invention retains the bookshelf structure.

On the other hand, in the compositions S to W, other than the tolan type liquid crystal, the ferroelectric liquid crystal phase disappeared or even if they existed the viscosity increased and the effect of reducing the viscosity could not be obtained.

Figure 6:
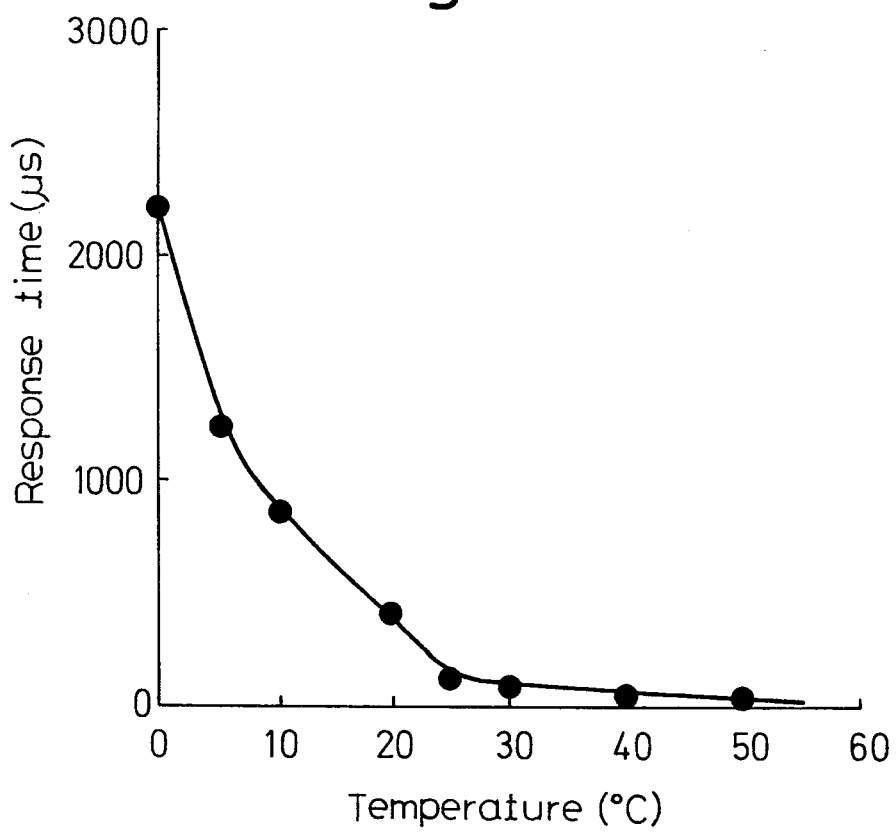
FIG. 6 is a graph showing temperature dependence of the response time of a naphthalene base liquid crystal [I]
Figure 7:
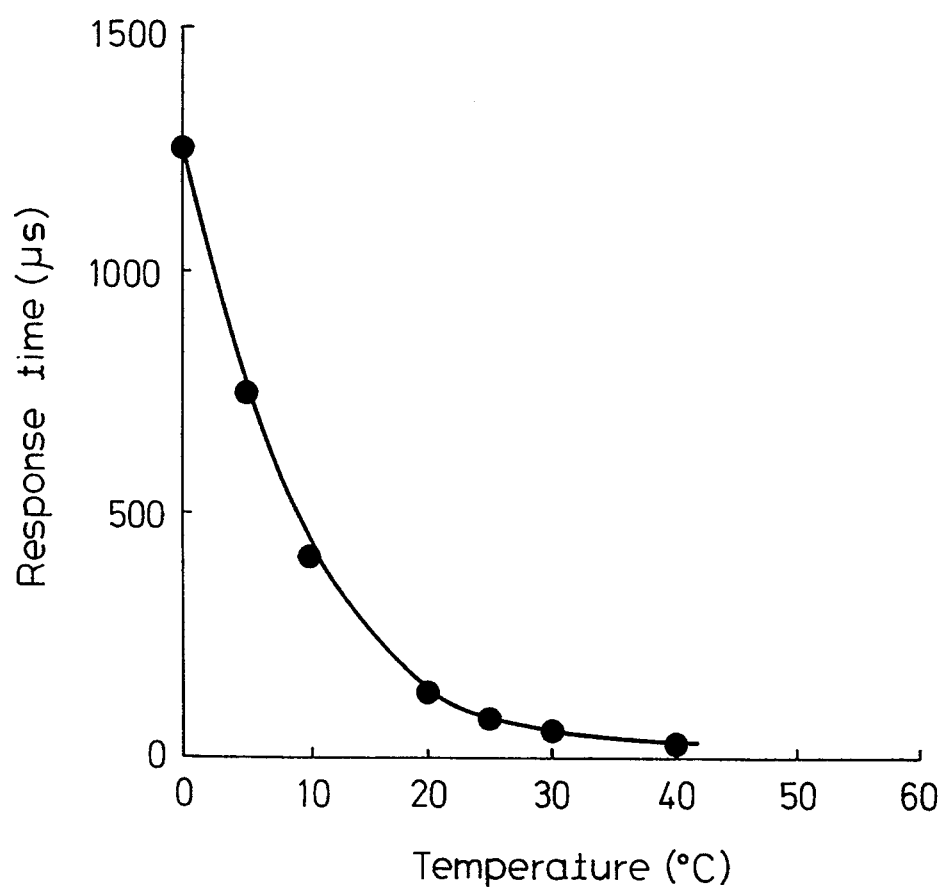
FIG. 7 is a graph showing temperature dependence of the response time of a liquid crystal composition (composition Q) of the present invention.
Figure 8:
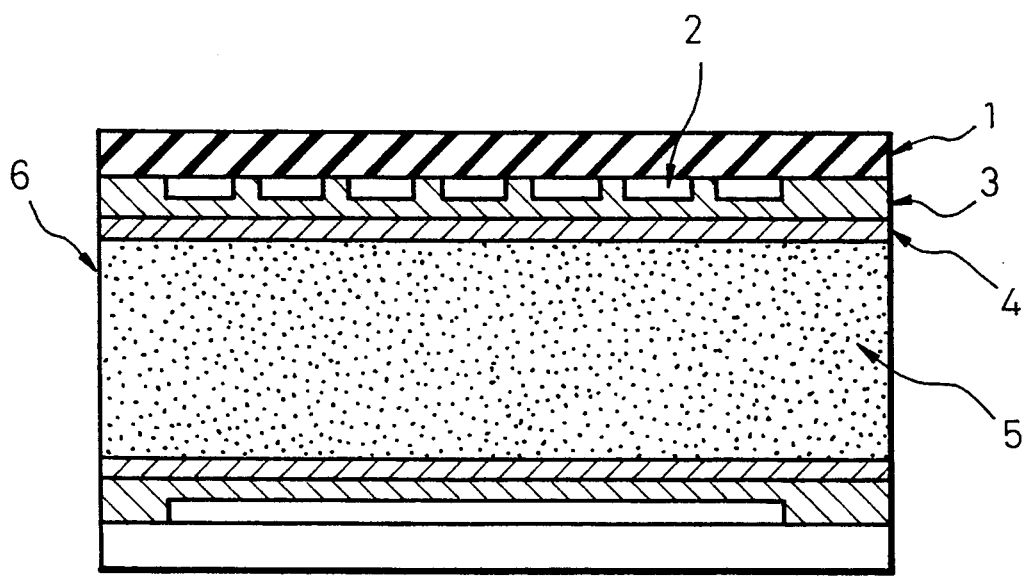
FIG. 8 is a structural view showing an example of a ferroelectric liquid crystal display of the present invention.

Next, FIGS. 6 and 7 show the temperature dependence of the response time of the naphthalene base liquid crystal [I] and that of the naphthalene-tolan type liquid crystal composition (Composition Q). As can be clearly understood from FIGS. 6 and 7, the response time was increased when the naphthalene base liquid crystal was used alone, due to an increase in the viscosity of the liquid crystal caused by the drop of the temperature. In the Composition Q, on the other hand, the response time was similarly extended at lower temperatures, but a response of below 500 μs could be obtained even at 10° C. because the absolute value of the viscosity was small.

It should also be understood that when the mixed composition was prepared with only the tolan type liquid crystals, the bookshelf layer structure could not be obtained as the liquid crystal layer structure, and the naphthalene-tolan mixed system had to be essentially used in order to keep a good layer structure and to obtain a low viscosity. To keep the bookshelf layer structure using the naphthalene type liquid crystal, the mixing ratio was at least 70 parts by weight in the total composition as already described. When the amount was less than 70 parts by weight, the bookshelf structure could not be easily retained. This mixing proportion was less than 30 parts by weight for the tolan type liquid crystal in the total composition. If the amount exceeded 30 parts by weight, the bookshelf layer became unstable and at the same time, the ferroelectric liquid phase itself became unstable, too.

TABLE 2

Viscosity (η), $S_A$-$S_c^*$ phase transition temperature and spontaneous polarization ($P_s$) of each liquid crystal composition

| Name of composition | η (25° C.:mPa.s) | $S_A$-$S_c^*$ phase transition temperature (C.°) | $P_s$ (nC/cm²) |
|---|---|---|---|
| I | 960 | 59.5 | 42.5 |
| II | 880 | 57.0 | 38.6 |
| A-1 | 380 | 42.8 | 33.8 |
| A-2 | 330 | 49.8 | 33.0 |
| A-3 | 270 | 38.7 | 29.2 |
| A-4 | 230 | 38.4 | 24.5 |
| A-5 | 170 | 38.0 | 20.5 |
| B | 315 | 48.2 | 23.3 |
| C | 295 | 44.3 | 21.1 |
| D | 310 | 43.8 | 22.3 |
| E | 290 | 45.7 | 18.9 |
| F | 330 | 44.0 | 26.3 |
| G | 340 | 45.8 | 26.3 |
| H | 325 | 44.1 | 25.2 |
| I | 195 | 39.5 | 15.5 |
| J | 190 | 38.1 | 14.1 |
| K | 250 | 42.6 | 18.0 |
| L | 220 | 40.8 | 17.6 |

TABLE 2-continued

Viscosity (η), $S_A$-$S_c^*$ phase transition temperature and spontaneous polarization ($P_s$) of each liquid crystal composition

| Name of composition | η (25° C.:mPa.s) | $S_A$-$S_c^*$ phase transition temperature (C.°) | $P_s$ (nC/cm²) |
|---|---|---|---|
| M | 190 | 39.2 | 20.8 |
| N | 190 | 39.7 | 19.9 |
| O | 195 | 44.5 | 19.5 |
| P | 175 | 39.9 | 16.5 |
| Q | 170 | 40.5 | 12.5 |
| R | 195 | 41.6 | 12.5 |
| S | 180 | 38.3 | 17.7 |
| T | 190 | 43.8 | 19.2 |
| U | $S_A$ at 25° C. | $S_A$ | $S_A$ at 25° C. |
| V | $S_A$ at 25° C. | $S_A$ | $S_A$ at 25° C. |
| W | 660 | 33.5 | 39.5 |
| X | 1020 | 55.8 | 43.0 |
| Y | $S_A$ at 25° C. | $S_A$ | $S_A$ at 25° C. |
| 1 | | | |
| 2 | | | |
| 3 | | | |
| 4 | 790 | 54 | 36.4 |
| 5 | 850 | 55 | 36.3 |

The present invention uses the compositions I and II as the naphthalene type liquid crystal composition, but the same result can of course be obtained by using other naphthalene type liquid crystal compositions having the bookshelf layer structure by mixing the tolan type liquid crystal.

The effects of the present invention are as follows. Namely, the naphthalene-tolan mixed system liquid crystal according to the present invention can reduce the viscosity of the naphthalene type liquid crystal composition, which has high viscosity in the mixed composition and high spontaneous polarization, and fails to provide good response characteristics, to ⅓ while retaining the bookshelf layer structure which in turn produces a high-quality display image, can also reduce the magnitude of spontaneous polarization to a half or below, and can provide a ferroelectric liquid crystal material generating a high-quantity image and excellent response characteristics.

We claim:

1. A ferroelectric liquid crystal composition comprising:

70 to 97 parts by weight of a naphthalene base mixed liquid crystal containing at least three kinds of liquid crystals selected from the following five kinds of liquid crystals expressed by the general formulas I to V:

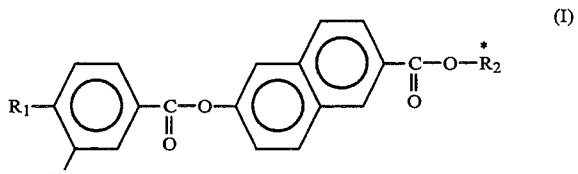

(I)

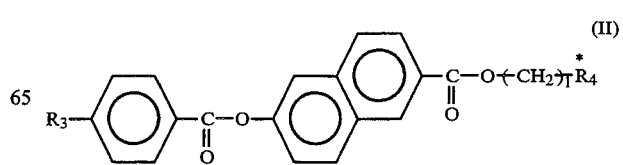

(II)

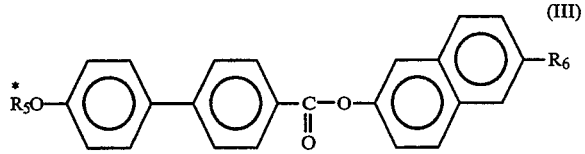

(III)

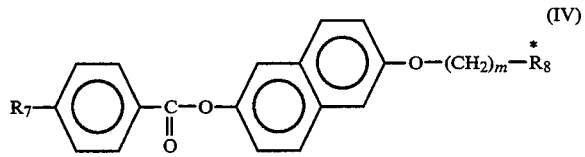

(IV)

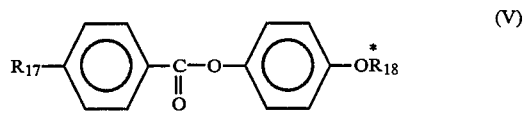

(V)

wherein each of $R_1$, $R_3$, $R_6$, $R_7$ and $R_{17}$ independently represents mutually a $C_{6-16}$ alkyl group or a $C_{6-16}$ alkoxy group; each of $R_2^*$, $R_4^*$, $R_5^*$, $R_8^*$ and $R_{18}^*$ independently represents a $C_{4-16}$ alkyl group having asymmetric carbon at the connecting bond thereof; X represents a hydrogen atom or a fluorine atom; and l and m represent an integer of 1 to 5, respectively; and 3 to 30 parts by weight of a tolan type liquid crystal expressed by the following general formula VI:

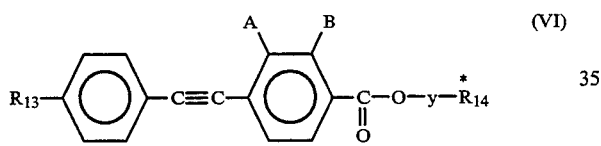

(VI)

wherein $R_{13}$ represents a $C_{6-16}$ alkyl group or a $C_{6-16}$ alkoxy group; $R_{14}^*$ represents a $C_{4-16}$ alkyl group having asymmetric carbon; each of A and B independently represents a hydrogen atom or a fluorine atom; and y represents $-(CH_2)_i-$, with the proviso that i represents an integer of 0 to 5.

2. A ferroelectric liquid crystal composition comprising:

70 to 97 parts by weight of a naphthalene base mixed liquid crystal containing at least three kinds of liquid crystals selected from the following five kinds of liquid crystals expressed by the general formulas I to V:

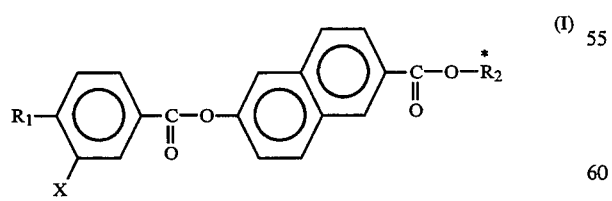

(I)

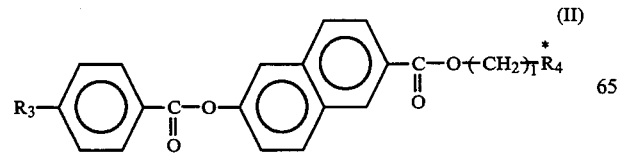

(II)

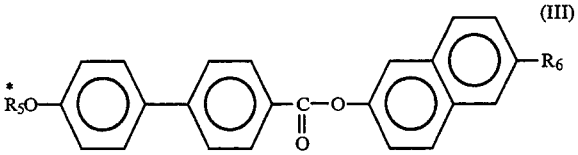

(III)

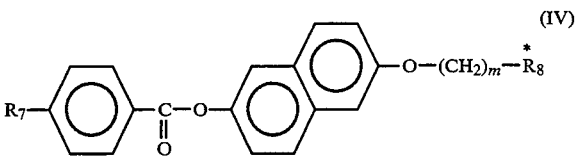

(IV)

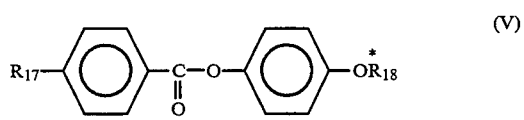

(V)

wherein each of $R_1$, $R_3$, $R_6$, $R_7$ and $R_{17}$ independently represents mutually a $C_{6-16}$ alkyl group or a $C_{6-16}$ alkoxy group; each of $R_2^*$, $R_4^*$, $R_5^*$, $R_8^*$ and $R_{18}^*$ independently represents a $C_{4-16}$ alkyl group having asymmetric carbon at the connecting bond thereof; X represents a hydrogen atom or a fluorine atom; and l and m represents an integer of 1 to 5, respectively; and 3 to 30 parts by weight of a tolan type liquid crystal expressed by the following general formula VII:

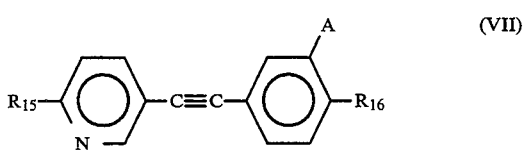

(VII)

wherein $R_{15}$ represents a $C_{6-16}$ alkyl group or a $C_{6-16}$ alkoxy group; $R_{16}$ represents a $C_{6-16}$ alkyl group or a $C_{6-16}$ alkoxy group; and A represents a hydrogen atom or a fluorine atom.

3. A ferroelectric liquid crystal composition comprising:

70 to 97 parts by weight of a naphthalene base mixed liquid crystal containing at least three kinds of liquid crystals selected from the following five kinds of liquid crystals expressed by the general formulas VIII to XI and V;

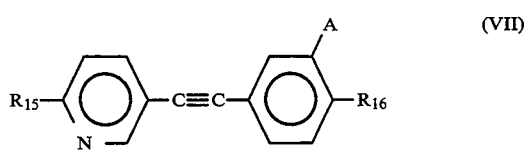

(VII)

wherein each of $R_1$, $R_6$, $R_9$, $R_{11}$ and $R_{17}$ independently represents a $C_{6-16}$ alkyl group or a $C_{6-16}$ alkoxy group; each of $R_2^*$, $R_5^*$, $R_{10}^*$, $R_{12}^*$ and $R_{18}^*$ independently represents a $C_{4-16}$ alkyl group having asymmetric carbon at the connecting bond thereof; and l represents an integer of 1 to 5; and 3 to 30 parts by weight of a tolan type liquid crystal expressed by the general formula VI:

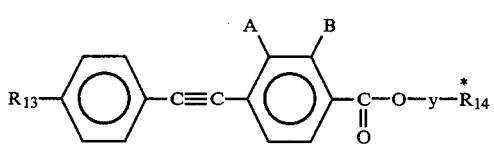
(VI)

wherein $R_{13}$ represents a $C_{6-16}$ alkyl group or a $C_{6-16}$ alkoxy group; $R_{14}{}^*$ represents a $C_{4-16}$ alkyl group having asymmetric carbon; A and B each independently represents a hydrogen atom or a fluorine atom; and y represents a —$(CH_2)_i$—, with the proviso that i represents an integer of 0 to 5.

4. A ferroelectric liquid crystal composition comprising:

70 to 97 parts by weight of a naphthalene base mixed liquid crystal containing at least three kinds of liquid crystals selected from the following five kinds of liquid crystals expressed by the general formulas VIII to XI and V:

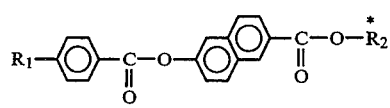
(VIII)

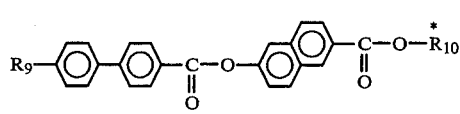
(IX)

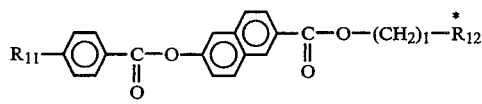
(X)

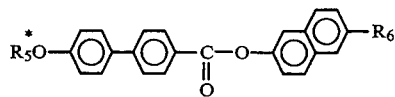
(XI)

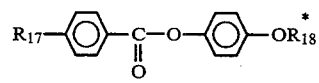
(V)

wherein each of $R_1$, $R_6$, $R_9$, $R_{11}$ and $R_{17}$ independently represents mutually a $C_{6-16}$ alkyl group or a $C_{6-16}$ alkoxy group; each of $R_2{}^*$, $R_5{}^*$, $R_{10}{}^*$, $R_{12}{}^*$ and $R_{18}{}^*$ independently represents a $C_{4-16}$ alkyl group having asymmetric carbon at the connecting bond thereof; and l represents an integer of 1 to 5; and 3 to 30 parts by weight of a tolan type liquid crystal expressed by the following general formula VII:

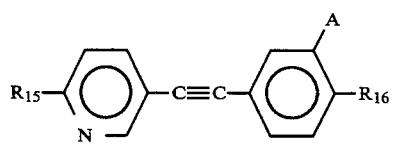
(VII)

wherein each of $R_{15}$ and $R_{16}$ independently represents a $C_{6-16}$ alkyl group or a $C_{6-16}$ alkoxy group; and A represents a hydrogen atom or a fluorine atom.

5. A ferroelectric liquid crystal composition comprising:

70 to 97 parts by weight of a naphthalene base mixed liquid crystal containing at least three kinds of liquid crystals selected from the following five kinds of liquid crystals expressed by the general formulas I to V:

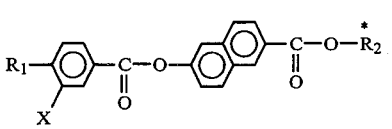
(I)

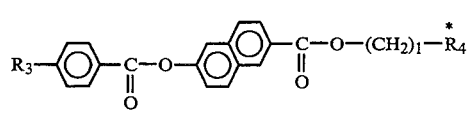
(II)

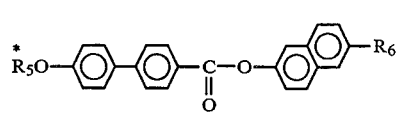
(III)

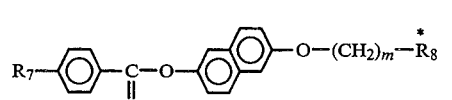
(IV)

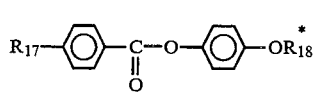
(V)

wherein each of $R_1$, $R_3$, $R_6$, $R_7$ and $R_{17}$ independently represents a $C_{6-16}$ alkyl group or a $C_{6-16}$ alkoxy group; each of $R_2{}^*$, $R_4{}^*$, $R_5{}^*$, $R_8{}^*$ and $R_{18}{}^*$ independently represents a $C_{4-16}$ alkyl group having asymmetric carbon at the connecting bond thereof; X represents a hydrogen atom or a fluorine atom; and l and m represent an integer of 1 to 5, respectively; and 3 to 30 parts by weight of a tolan type liquid crystal expressed by the following general formulas VI and VII:

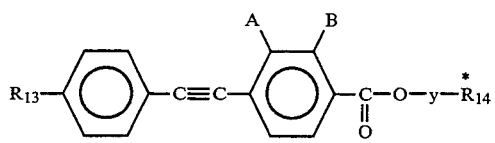
(VI)

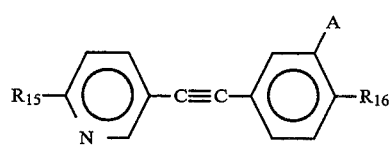
(VII)

wherein each of $R_{13}$, $R_{15}$ and $R_{16}$ independently represents a $C_{6-16}$ alkyl group or a $C_{6-16}$ alkoxy group; $R_{14}{}^*$ represents a $C_{4-16}$ alkyl group having asymmetric carbon; A and B each independently represents a hydrogen atom or a fluorine atom; and y represents —$(CH_2)_i$—, with the proviso that i is an integer of 0 to 5.

6. A ferroelectric liquid crystal composition comprising:

70 to 97 parts by weight of a naphthalene base mixed liquid crystal containing at least three kinds of liquid crystals selected from the following five kinds of liquid crystals expressed by the following general formulas VIII to XI and V:

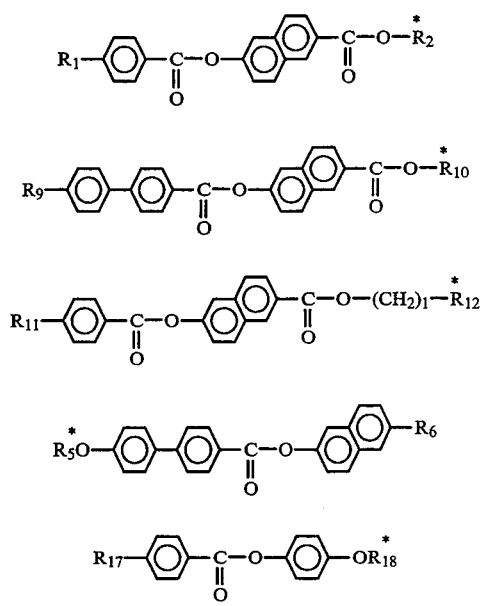

wherein each of $R_1$, $R_6$, $R_9$, $R_{11}$ and $R_{17}$ independently represents mutually a $C_{6-16}$ alkyl group or a $C_{6-16}$ alkoxy group; each of $R_2^*$, $R_5^*$, $R_{10}^*$, $R_{12}^*$ and $R_{18}^*$ independently represents mutually a $C_{4-16}$ alkyl group having asymmetric carbon at the connecting bond thereof; and l represents an integer of 1 to 5; and 5 to 30 parts by weight of a tolan type mixed liquid crystal expressed by the following general formulas VI and VII:

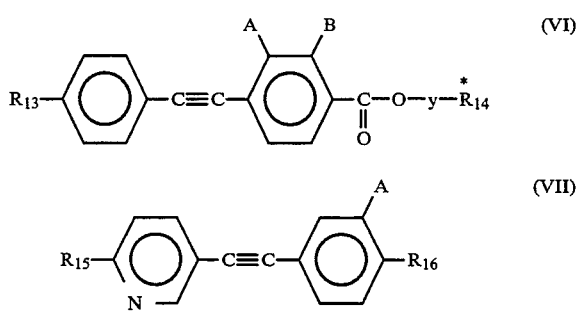

wherein each of $R_{13}$, $R_{15}$ and $R_{16}$ independently represents a $C_{6-16}$ alkyl group or a $C_{6-16}$ alkoxy group; $R_{14}^*$ represents a $C_{4-16}$ alkyl group having asymmetric carbon; A and B each independently represents a hydrogen atom or a fluorine atom; and y represents $—(CH_2)_i—$, with the proviso that i is an integer of 0 to 5.

* * * * *